July 14, 1942.  F. TUTTLE ET AL  2,289,811
PHOTOGRAPHIC PROJECTOR
Filed Aug. 2, 1940  6 Sheets-Sheet 1

FORDYCE TUTTLE
ALBERT B. FULLER
INVENTORS

BY
ATTORNEYS

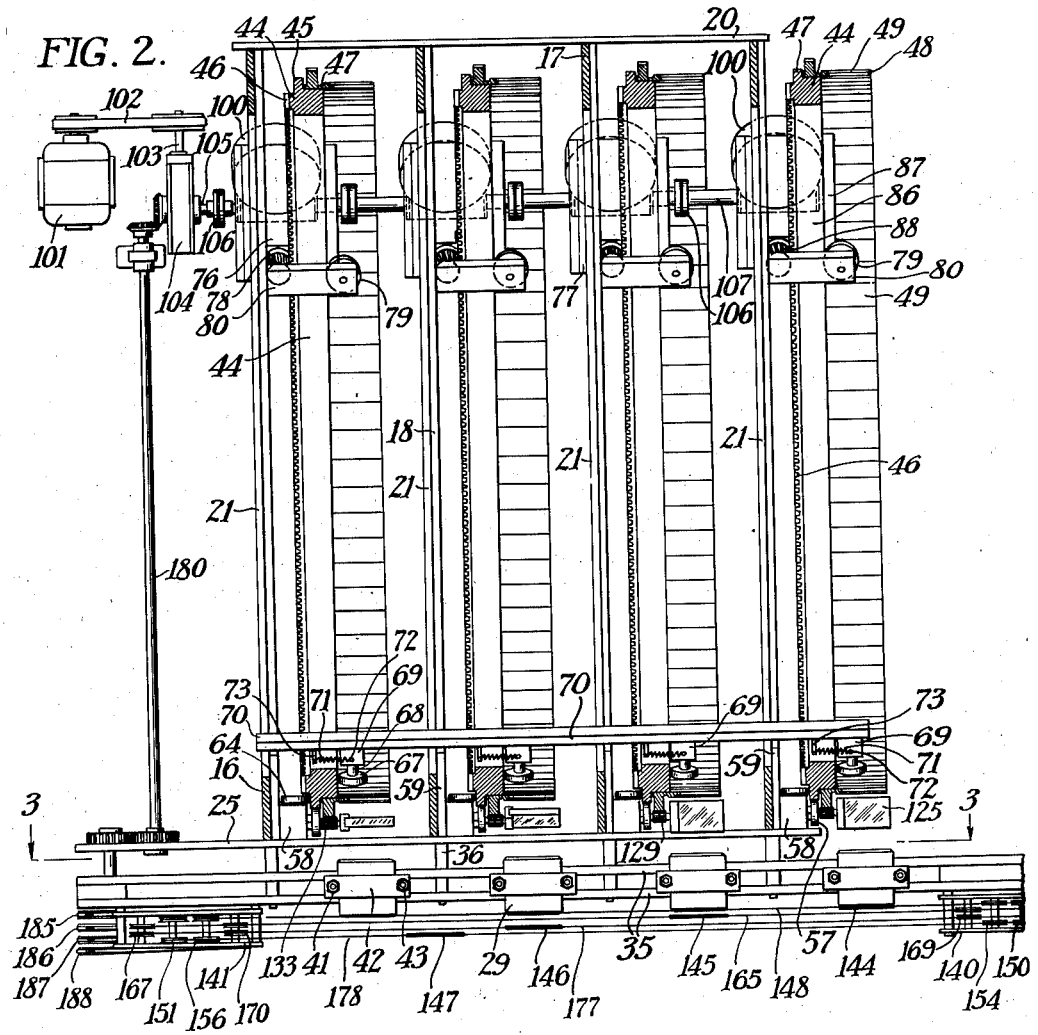

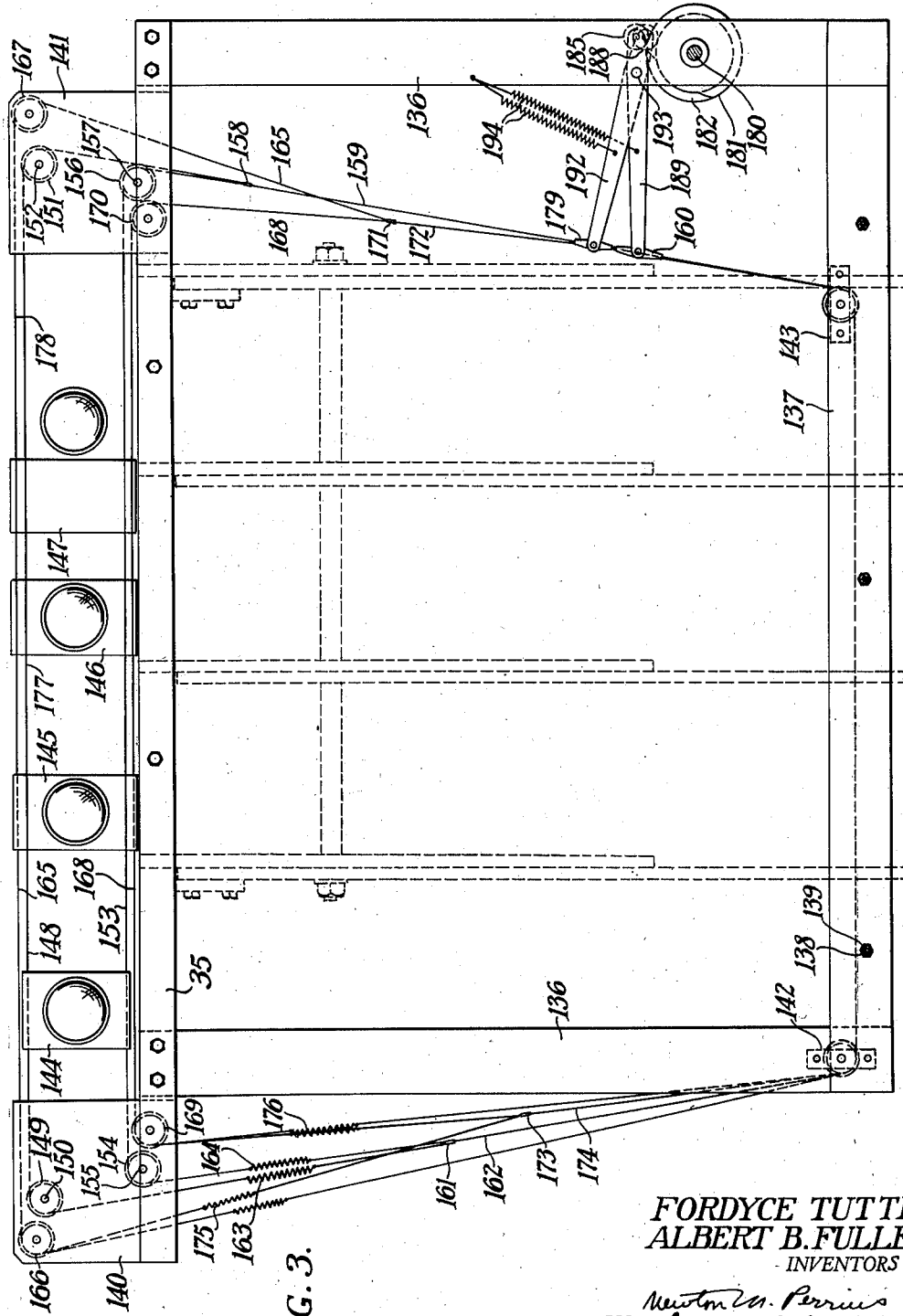

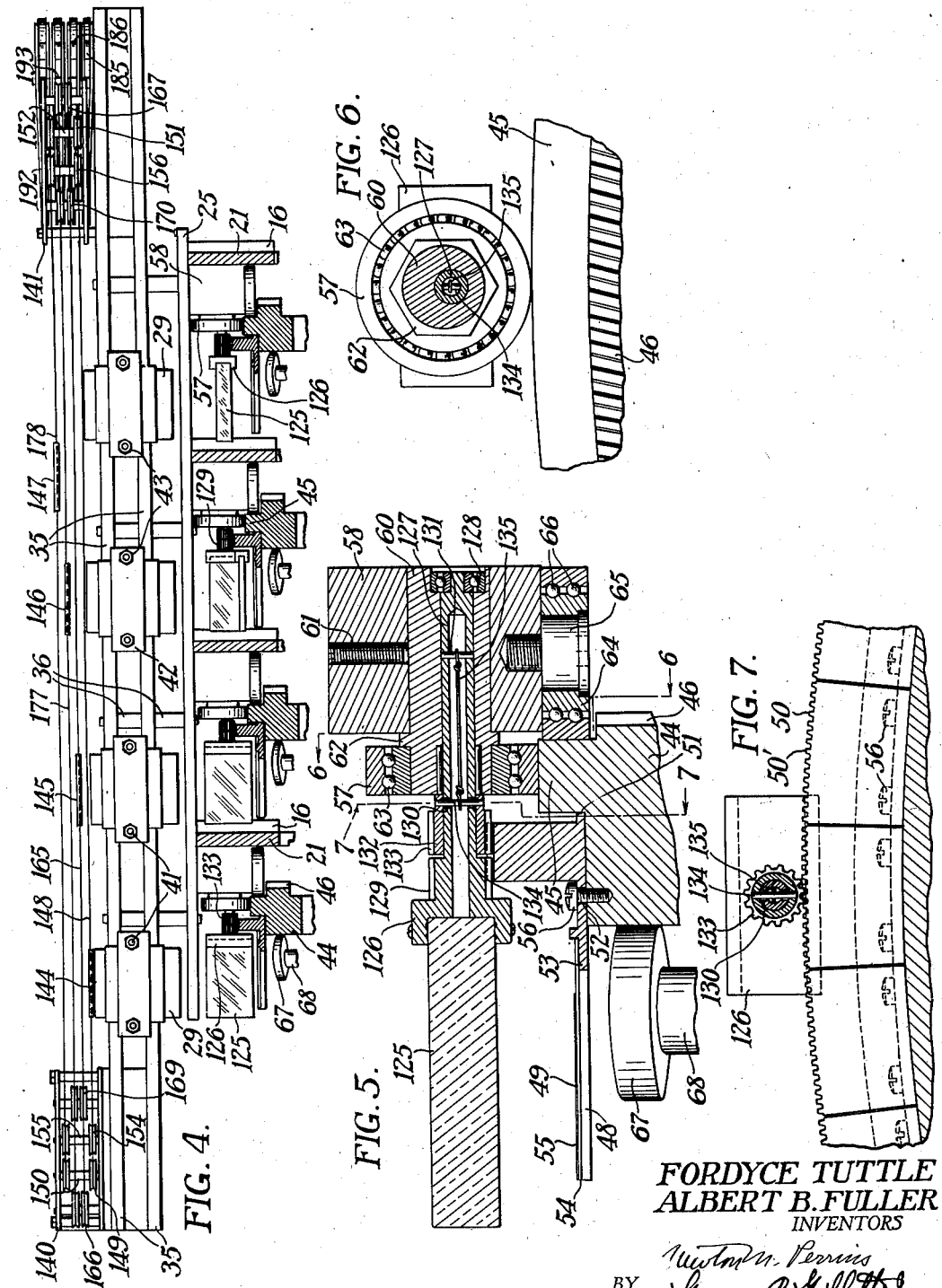

July 14, 1942.　　F. TUTTLE ET AL　　2,289,811
PHOTOGRAPHIC PROJECTOR
Filed Aug. 2, 1940　　6 Sheets-Sheet 5
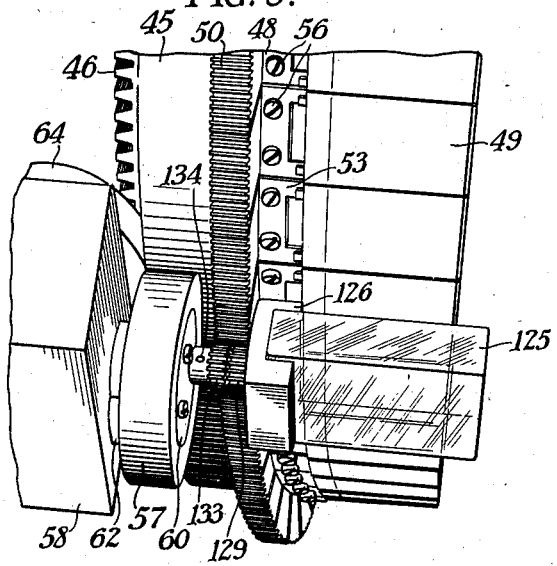
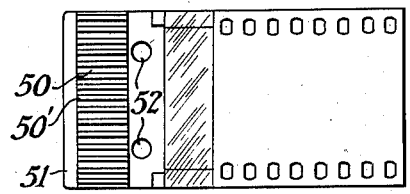
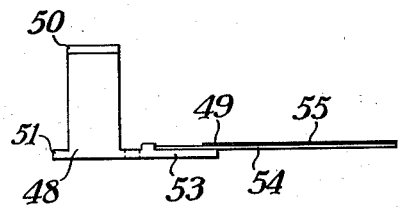
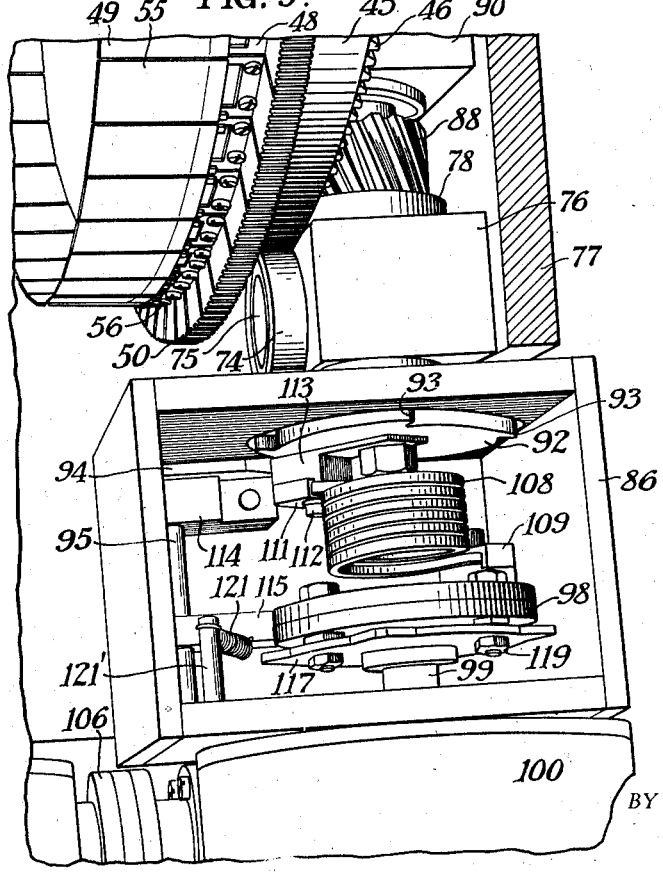
FORDYCE TUTTLE
ALBERT B. FULLER
INVENTORS
BY
ATTORNEYS July 14, 1942.   F. TUTTLE ET AL   2,289,811
PHOTOGRAPHIC PROJECTOR
Filed Aug. 2, 1940   6 Sheets—Sheet 6

FORDYCE TUTTLE
ALBERT B. FULLER
INVENTORS

BY *Newton M. Perrin*
*George A. Gillette, Jr.*
ATTORNEYS

Patented July 14, 1942

2,289,811

UNITED STATES PATENT OFFICE 2,289,811

PHOTOGRAPHIC PROJECTOR

Fordyce Tuttle and Albert B. Fuller, Rochester, N. Y., assignors to Eastman Kodak Company, Rochester, N. Y., a corporation of New Jersey Application August 2, 1940, Serial No. 350,004

33 Claims. (Cl. 88—27)

The present invention relates to a photographic projector and more particularly to a high wattage projector including separate or individual image elements or transparencies.

By far the most difficult problem encountered in a high wattage projector is the arrangement of the image elements so that they will not be deteriorated or destroyed by the light beam. The intense heat of a high wattage light beam also makes it practically impossible to keep a bare film from buckling to distort the image projected. On the other hand, separate mounting of the film or image elements introduces a complication because of the difficulty in accurately or precisely registering the successive images to prevent unsteadiness on the screen.

The primary object of the present invention is to provide a projection apparatus having individual image elements which are mounted so that they may be subjected to a high wattage light source and so that the projected images from successive elements will be precisely registered on the screen.

Another object of the invention is the provision of separate image elements mounted upon a movable carrier which may be accurately indexed and which is supported so that the image elements are successively moved into a gate station and into the focal plane of the optical system of the projector.

A further object of the invention is the provision of image elements which are precisely mounted on a holder which may be attached to a movable carrier, and an optical compensator at the gate station which is operated by the mechanical element of said holder to compensate for any inaccuracy or vibration of the carrier upon indexing.

A still further object of the invention is the provision of an indexing means for the image element carrier of the torsion-pendulum type for accurately indexing the image carrier to bring successive elements into the gate station.

An additional object of the invention is the provision of an image carrier having a plurality of mechanical elements and individual image elements mounted in precise predetermined relation thereto, an indexing means for intermittently moving the carrier to bring successive image elements into the gate station, and an optical compensator in alignment with the gate station, and operatively connected to the mechanical element corresponding to the image element at the gate station and correcting for any movement and/or displacement of the image element with respect to said gate station.

Still another object of the invention is the provision of a projection apparatus having at least two phases and a gate at each station for each phase, a pair of image carriers supporting individual image elements mounted in precise relation to respective mechanical elements on the carrier, an indexing means for each carrier, an optical compensator at each gate station and a pair of shutter assemblies arranged and operated to be opened in timed relation to said indexing means only when the mechanical element corresponding to the image element at the gate is operatively connected to the optical compensator.

Other and further objects of the invention will be apparent or suggested to those skilled in the art by the following description.

The above and other objects of the invention are embodied in a projection apparatus having a gate station and including in combination an illuminating and optical system in alignment with the gate station, a carrier member carrying a plurality of image elements and having a plurality of mechanical elements each accurately located with respect to a respective image element, a mounting means for supporting the carrier member for movement of each of the image elements into said gate station, an indexing means for intermittently moving the carrier member to bring the image elements into the gate station, and an optical compensator at the gate station, operatively connected to the carrier member through the mechanical element corresponding to the image element in the gate station and correcting for any movement and/or displacement of said image element with respect to said illuminating and optical system. The aforementioned features of a projection apparatus are particularly suited for duplication to form a multiple phase projection apparatus, which has great adaptability for the creation of various effects and which is particularly suited to automatic control.

Reference is hereby made to the accompanying drawings wherein similar reference characters designate similar elements and wherein:

Fig. 2 is a plan view of the projection apparatus of the invention.

Fig. 3 is a rear elevation of the shutter system which may be applied to the multiple phase projector as viewed from the plane 3—3 of Fig. 2.

Fig. 4 is a fragmentary plan view of the shutter system, objectives and optical compensators of the multiple phase projector.

Fig. 5 is a fragmentary cross section through the optical compensator, carrier and mounting means for the carrier at a gate station.

Fig. 6 is a transverse fragmentary cross section taken on the line 6—6 of Fig. 5.

Fig. 7 is also a transverse fragmentary cross section taken on the line 7—7 of Fig. 5.

Fig. 8 is a fragmentary perspective showing a plurality of slide holders on a carrier, the optical compensator operated by toothed portions of said holders, and a mounting roller for supporting and locating the carrier.

Fig. 9 is also a fragmentary perspective showing a portion of the carrier and an indexing means for intermittently moving the carrier to bring successive image elements into the gate station.

Figs. 10 and 11 are, respectively, plan and side views of a holder for an image element and having a toothed portion.

Figure 1:
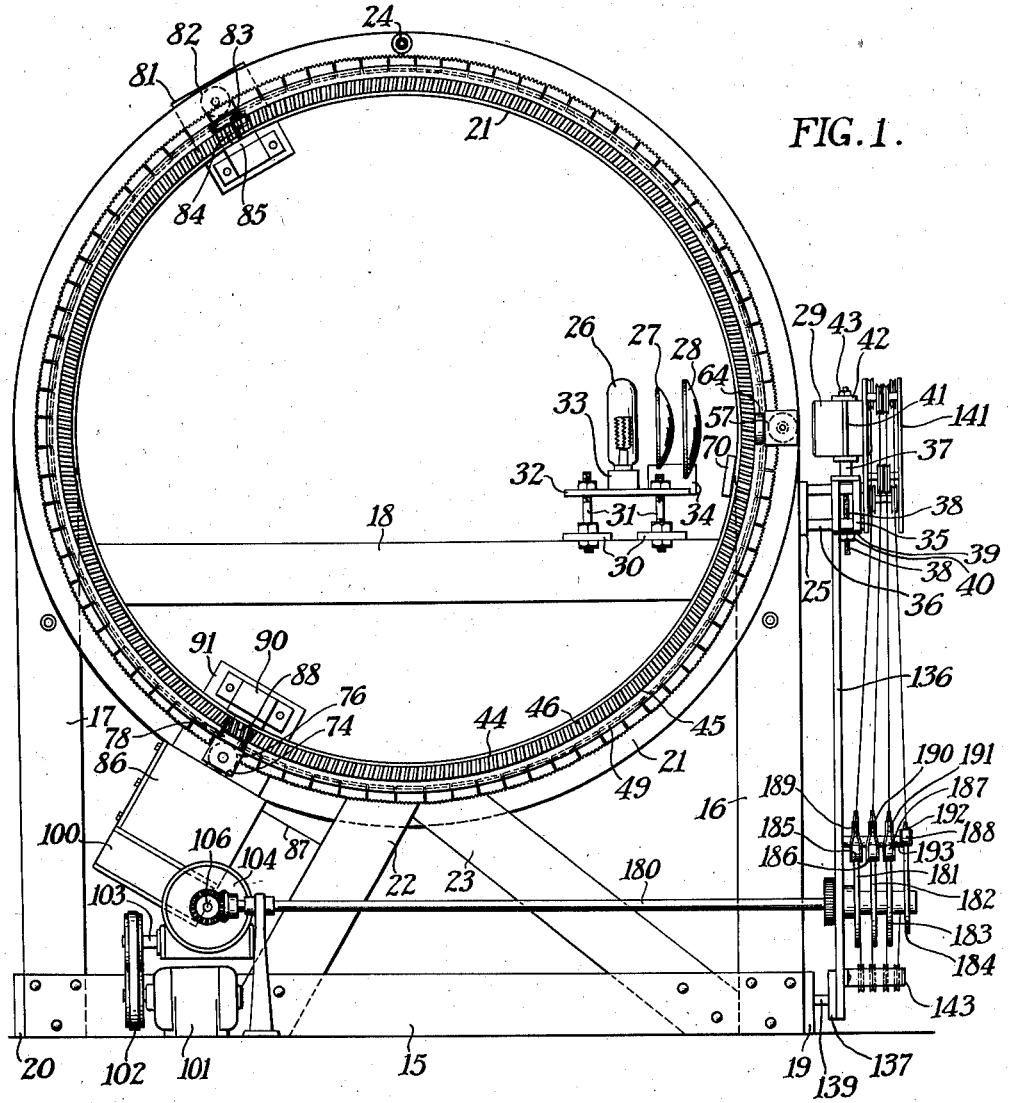
Fig. 1 is a side elevation of a projection apparatus according to the invention.

The illustrated embodiment of the invention shows a multiple phase projector adapted and arranged for continuous operation to give a motion picture effect on the screen but it must be understood that the salient features of the invention, such as the carrier, mounting means and indexing means therefor and the optical compensator may all be used in a single or multiple phase projector which is operated at longer or variable intervals to give a still picture effect but which pictures may nevertheless be dissolved, one into the other.

The various elements of the projector may be supported or positioned by any suitable frame and, by way of illustration only, the frame member disclosed herein comprises a plurality of base bars 15 each supporting a plurality of front upright bars 16 and a plurality of rear upright bars 17. Horizontal cross bars 18 are connected at each end to the respective upright bars 16 and 17. A front spacer bar 19 and a rear spacer bar 20 are bolted to respective ends of the base bars 15. A plurality of ring supports 21 are supported at the bottom by diagonal braces 22 and 23 which have their lower ends connected to the base bars 15 and the upper ends bolted to the ring supports 21. Diametrically opposite portions of said ring supports 21 are fastened respectively to the front upright bars 16 and rear upright bars 17, said ring supports 21 being held in proper spaced relation at their tops by a spacing rod 24. An upper front spacer bar 25 is fastened to the front edges near the top of the front upright bars 16.

Since each projector phase is identical, the following description will explain in detail only the elements of a single phase, it being understood that all phases are the same in construction and operation.

The illuminating and optical system for each phase comprises a light source or incandescent lamp 26, a pair of condenser lenses 27 and 28, and a projection lens, not shown, but mounted within the lens barrel 29. A pair of cross members 30 are fastened to the cross bars 18 and bolts 31 mounted thereon support a platform 32 on which are mounted the socket 33 for the incandescent lamp 26 and a bracket 34 for supporting the condenser lenses 27 and 28. A pair of lens support bars 35 are supported by spacers 36 from the upper spacer bar 25 and the projection lenses or projection lens barrel 29 are adjustably mounted on said bars 35 by clamping assemblies including a base 37 clamped to the bars 35 by a bolt 38, washer 39 and nut 40, a pair of bolts 41 extending upwardly on each side of the barrel 29 through the ends of a strap 42 into engagement with nuts 43. By such an arrangement the projection lenses may be individually moved transversely of the projector, may be rotated to any desired angle, and may be moved along their optical axis to bring their focal planes at the gate stations of the projector.

*Image carriers*

The image carrier for each phase of the projector includes a movable member to which are attached a plurality of separate individual image elements. Preferably, the image carrier is annular in form and comprises a ring carrier 44 having an annular shoulder 45 and having an annular ring of gear teeth 46 cut into a lateral face of the ring carrier 44.

A plurality of separate image elements are detachably fastened to a peripheral rim 47 of the ring carrier 44. Such image elements, see particularly Figs. 10 and 11, comprise a holder 48 and a transparency slide 49. The holder 48 carries one or more mechanical elements preferably in the form of a toothed sector 50, has a flange 51 to assist in locating the holder 48 on the peripheral rim 47, is provided with a pair of holes 52 and has a projecting plane portion 53 on which the transparency slide is mounted. Said transparency slide preferably comprises a transparent glass plate 54 onto which is cemented a photographic transparency 55. Said photographic transparency is of the known type including a base of cellulose derivative or ester and having on one side a gelatino-silver halide image layer. Such photographic transparency 55 is cemented to the glass plate 54 in any suitable manner but in order to withstand the intense heat of the light beam of a high wattage projector the cementation of the transparency 55 onto the glass plate 54 should be accomplished according to the disclosure in the copending application of Koch and Tuttle, Serial No. 349,584, filed August 2, 1940, for Transparency slide-projector holder and method and apparatus for assembling the same. Also, the transparency slide 49 is mounted upon the plane portion 53 of holder 48 in an extremely precise relation to one of the mechanical elements of holder 48 or preferably with respect to the center tooth 50' of the toothed sector 50 preferably by the method and apparatus also disclosed in the aforementioned copending application of Koch and Tuttle. It must be positively borne in mind in order to appreciate the present invention that each of the transparencies or transparency slides are mounted with extreme accuracy with respect to the mechanical element or more specifically that a pair of spaced perforations of each photographic transparency 55 are accurately located relative to the center tooth 50' of the toothed sector 50.

A plurality of such transparency slide-projector holders are mounted around the peripheral rim 47 of the ring carrier 44. Specifically, such mounting may be accomplished by a pair of screws 56 extending through the holes 52 of each holder 48 and threaded into tapped holes in the peripheral rim 47, this arrangement of the image elements is best illustrated in Figs. 1, 8 and 9. By such positioning of a plurality of holders 48 around the entire periphery of peripheral rim 47 the several toothed sectors 50 abut each other end to end and form a continuous annular spur gear around the periphery of the image carrier or ring carrier 44.

*Mounting means for image carrier*

Since the image or ring carriers 44 are of considerable diameter and weight, the mounting of such image carriers presents a real problem especially because the rings may become warped or otherwise distorted. In view of this fact the ring carriers 44 are preferably mounted from their periphery and without respect to an actual center by means of a plurality of radial supporting members and a plurality of lateral guide members.

One such radial supporting member comprises a roller 57 rotatably mounted by a supporting block 58 which is attached to the frame member. Specifically, the supporting block 58 is mounted on a base plate 59 which is attached to the corresponding ring support 21. A sleeve 60 is inserted into a bore in block 58, see Fig. 7, and held in position by a set screw 61. Said sleeve 60 has a hexagonal collar 62 abutting against the face of block 58 and supports a ball-bearing mounting 63 which in turn supports the aforementioned roller 57. Said ball-bearing roller 57 has its periphery in engagement with the peripheral surface of the annular shoulder 45 of the ring carrier 44.

This radial supporting member is located adjacent the gate station or the point at which the image elements on the carrier are in alignment with the illuminating and optical system of the projector phase. A pair of lateral guide members are also located to engage the sides of the ring carrier 44 so as to accurately align the same and the image elements thereon during their passage through the gate station.

One lateral guide member may comprise a roller 64 which is supported for rotation on another face of supporting block 58 by means of a flanged stub shaft 65 threaded into block 58 and an intervening ball-bearing mounting 66, the periphery of roller 64 engaging one side of the annular shoulder 45.

The complementary lateral guide member comprises a spring pressed roller engaging a lateral face of ring carrier 44 beneath the row of image elements thereon and slightly below the gate station. Such a lateral guide member preferably comprises a ball-bearing roller 67 mounted on a shaft 68 which is supported from a block 69 pivotally mounted on a cross bar 70 which is attached to the various ring supports 21. Said roller 67 is normally spring pressed against the side of ring carrier 44 by means of a coil spring 71 attached at one end to a pin 72 on block 69 and at the other end to a pin 73 on cross bar 70.

Thus it will be seen that irrespective of any eccentricity or warping of the ring carrier 44, that portion of the ring carrier 44 which is adjacent the gate station will be accurately located by means of the radial supporting member or roller 57 and by means of the lateral guide members composed of roller 64 and the opposed spring pressed roller 67.

Figure 13:
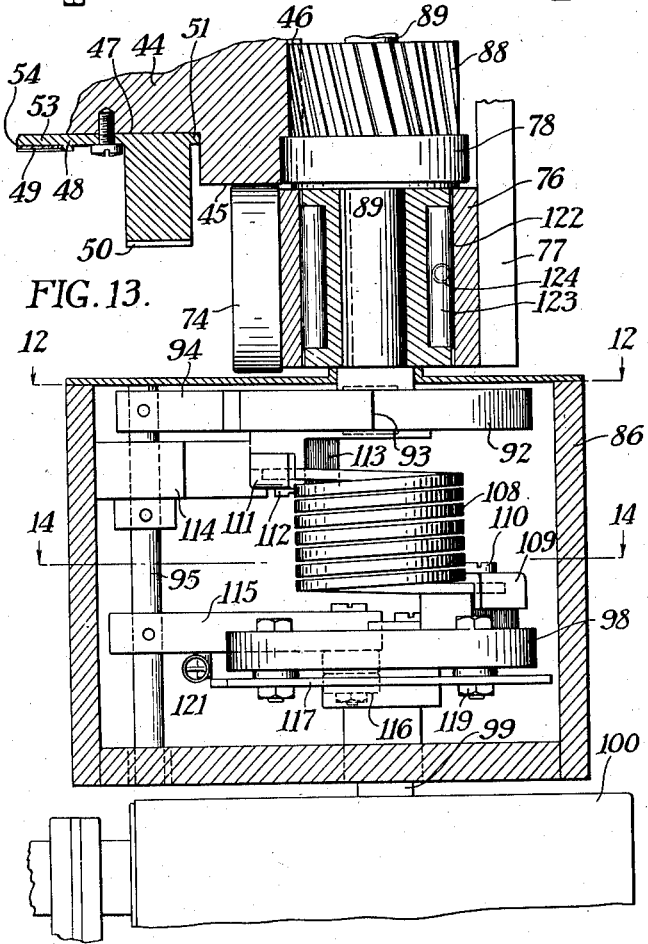
Fig. 13 is a plan view of the indexing means including a fragmentary section of the image carrier and illustrates the manner of supporting said carrier adjacent the indexing means.

Another radial support member for the image carrier is placed below the same but on the opposite side of its center of gravity so that the weight of the ring carrier will throw its annular shoulder 45 against the other radial supporting member or roller 57. Such radial supporting member is again preferably in the form of a roller 74, see Figs. 9 and 13, and which is rotatably mounted on a stub shaft 75 mounted in a supporting block 76. The supporting block 76 is mounted on a base plate 77 which is also attached to the respective ring support 21.

A set of lateral guide members are also located at this point and comprise a ball-bearing roller 78 journaled on the shaft of the indexing means later to be described and bearing against one side of the annular shoulder 45. The complementary lateral guide member again preferably comprises a ball-bearing roller 79 movably mounted on a supporting bracket 80 and spring pressed, by an arrangement similar to that shown in connection with roller 67 against the opposite face of annular shoulder 45 below the row of image elements or transparency slides 49.

Finally, a third set of radial and lateral ring supporting members are mounted on the ring supports 21 equidistant from the set of rollers 57, 64 and 67 at the gate station and the set of rollers 74, 78 and 79 at the indexing station. A supporting plate 81 is mounted on each ring support 21 and carries a ball-bearing roller 82 which is spring pressed against the periphery of annular shoulder 45. It is obvious that the other two radial supporting members support the entire weight of the image carrier and the spring pressed roller 82 merely serves to prevent the image carrier from being accidentally displaced under some abnormal condition. The lateral guide members at this point comprise a ball-bearing roller 83 mounted for rotation on a shaft 84 which is supported by a block 85 on the supporting plate 81, and an opposite spring pressed roller, not shown, but similar to the arrangement of rollers 67 and 79, is provided for lateral guiding of the ring carrier 44 at three separate points.

It is pointed out that the arrangement of these radial supporting members or rollers for the ring carrier 44 is of particular advantage because they constitute a centerless mounting for the ring carrier which by its own weight is thrown into engagement with the roller 57 at the gate station and is accurately guided laterally at the gate station by the rollers 64 and 67. Thus, even if the ring carrier 44 is warped so that its other portions are somewhat out of position or out of line, that portion of the carrier which is at the gate is accurately located so that the image elements on the carrier will be in the focal plane of the objective and that portion of the ring carrier 44 which is engaged by the indexing means is also held in position for good gear contact at that point. In other words, the ring carrier 44 is supported so that only two portions of it must be in definite positions which is, of course, possible because any surface can be made to pass through two given points.

*Indexing means*

An indexing means is operatively connected to each image carrier for intermittently or periodically moving said image carrier to bring another image element into the gate station or into alignment with the illuminating and optical system of the projector phase. On account of the large mass of the image carrier and comparatively short time permitted for indexing thereof, it is extremely difficult to obtain smooth and accurate indexing of the image carrier. In general, the indexing means of the present invention takes advantage of the torsion-pendulum characteristics of a resilient means whereby said resilient means is tensioned and then released to impart its energy to the ring carrier and passes through a condition of equilibrium whereupon the resilient means then acts to retard the image carrier to absorb all of its energy just as the image carrier completes its indexing movement. Although tensioned springs have previously been used for indexing an image carrier, such arrangements at all times maintained the tension on the spring and did not utilize the spring to retard and stop the image carrier.

One form of torsion-pendulum indexing means according to the invention will now be described. Such an indexing means may comprise a driven member operatively connected to the image carrier, an escapement engaging and holding said driven member, a driving member, a spring member connected between said driving and driven members, and a control means movable with the driving member and for releasing the escapement after the spring member has been tensioned by the driving member. By such an arrangement the spring member may act first to impart its energy to the image carrier, later to receive energy from the carrier by opposing its movement, and finally to bring the carrier to rest just as the escapement is re-engaged whereupon the spring member is again tensioned by the driving member and the cylcle may be repeated.

Such an indexing means is mounted at least partially within a closed housing 86 which is filled with a liquid lubricant, such as oil. Each housing 86 is supported by a bracket 87, see Fig. 1, from the diagonal brace 22. The driving member comprises a pinion gear 88 mounted upon a shaft 89 which is journaled at one end in a bearing block 90 on a base plate 91 attached to the corresponding ring support 21 and journaled near its other end in the supporting block 76, the extreme end of shaft 89 extending into the housing 86. As previously explained, the roller 78 is mounted concentric with the shaft 89 for lateral guiding of the ring carrier 44 and so as to control the gear contact between the pinion gear 88 and the ring gear teeth 46 on the ring carrier 44.

The escapement comprises a disk 92 having a plurality of teeth 93, preferably arranged in quadrature about disk 92, and an escapement arm 94 pinned to a shaft 95 and carrying a hood member 96 of inverted U-shaped cross section and fastened to the arm 94 by a screw 97. Said hood member 96 is formed to enclose the top and sides of the tooth 93 as it moves into abutment with the end of arm 94. As a result, when the housing 86 is filled with a liquid lubricant, some of such lubricant will be trapped between the tooth 93, the end of arm 94 and the hood member 96 so that the abutment between said tooth 93 and arm 94 will be cushioned. The clearance between hood member 96 and the sides of disk 92 and teeth 93 may be selected so that the cushion effect is not excessive and so that the accuracy of engagement of the escapement is not impaired.

The driving means comprises a disk 98 keyed to the end of a shaft 99 which is preferably the output shaft of a reduction gear assembly 100. In practice, each of the reduction gear assemblies 100 are driven by a motor 101 connected by a belt 102 to the input shaft 103 of a reduction gear assembly 104, the output shaft 105 of said reduction gear assembly 104 being connected by a series of couplings 106 and shafts 107 to the respective input shafts of the gear reduction assemblies 100.

A resilient means, preferably in the form of a coil spring 108 is connected between the driving and driven members of the indexing means just described.

Figure 12:
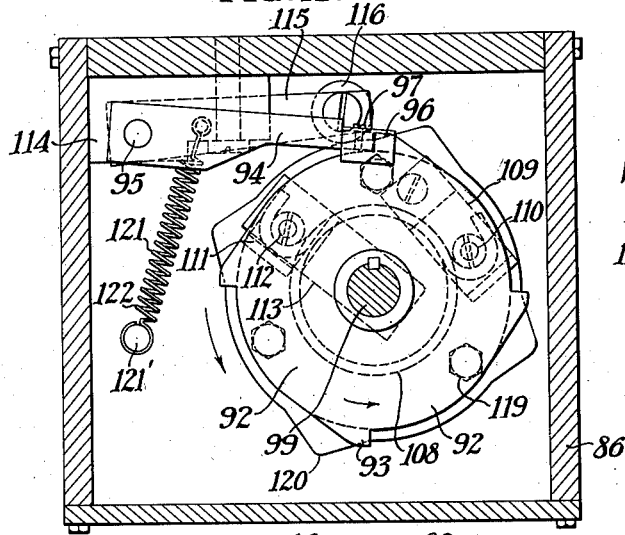
Fig. 12 is a transverse cross section through the indexing means taken on the line 12—12 of Fig. 13.
Figure 14:
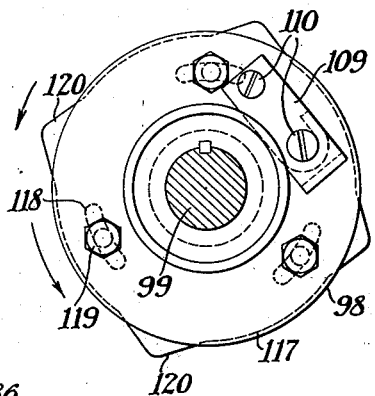
Fig. 14 is an end view of the driving member in the indexing means as viewed from the cutting plane taken on the line 14—14 of Fig. 13.

Specifically, the ends of said coil spring 108 are reversely curved, see Fig. 12, one of such ends being attached to disk 98 by a clamp 109 and bolts 110 and the other end of spring 108 being fastened by a clamp 111 and bolt 112 to an arm 113 which is fastened to the disk 92.

The shaft 95 is journaled to a bearing 114 within housing 86 and in one wall of such housing. Such shaft 95 supports the escapement arm 94 as already explained and also supports an arm 115 which carries on its free end a roller 116. A control cam plate 117 is provided with a plurality of arcuate slots 118 and is adjustably fastened to disk 98 by means of bolts 119. Said cam plate 117 carries a plurality of rises 120 which correspond in number and spacing on the cam plate 117 with the number and spacing of the teeth 93 on the disk 92. However, as will be subsequently explained said cam plate 117 is adjusted with respect to disk 98 in order to cause actuation of the control arm 114 and escapement arm 94 at the proper time with respect to the tensioning and period of the coil spring 108. The escapement arm 94 and control arm 115 are both held normally and respectively to engage the teeth 93 on disk 92 and rises 120 on cam plate 117 by a coil spring 121 connected at one end to a pin 121' on a wall of the housing 86 and at the other end to the control arm 115.

The operation of the indexing means of the invention will now be described in some detail. At the beginning of a cycle of indexing the coil spring 108 is under tension and a tooth 93 on the escapement disk 92 is in engagement with the escapement arm 94. This tensioning has been caused by rotation of the driving member or disk 98 while the driven member of the indexing means is held stationary. As soon as the peak of one rise 120 on the control cam plate 117 comes into engagement with the roller 116, the arm 115 is raised against the action of coil spring 121 and the escapement arm 94 is also raised to move the end of arm 94 out of engagement with the tooth 93 on the disk 92. Upon dis-engagement of the escapement the tensioned coil spring 108 is now free to rotate the disk 92, shaft 89 and pinion gear 88 which in turn rotates the ring gear 46 on the image carrier or ring carrier 44. At this time the potential energy stored in the tensioned spring 108 is imparted to the image carrier which is caused to move. The period or frequency of the coil spring 108 is such that it soon gives up all of its potential energy and then begins to oppose the movement of the image carrier and driven member to again become tensioned in the opposite direction. The coil spring 108 is also designed so that it absorbs energy due to the inertia of the image carrier and associated parts to bring them to rest just as the next tooth 93 on the disk 92 comes into abutment with the end of escapement arm 94. As before mentioned this abutment of the teeth 93 on disk 92 and of the escapement arm 94 is cushioned by the trapping of oil under the hood member 96. However, the driving member 98 has been rotating continuously and upon the reverse tensioning of the spring member 108 is driven thereby so that, except for friction losses, the energy put into the spring member 108 by the motor 101 is now returned until the spring 108 again reaches equilibrium whereupon it is tensioned by further rotation of disk 98 to place it under tension for a repetition of the cycle. It will be understood that any excessive tensioning of the spring 108 and lack of braking effect upon the image carrier, or vice versa any excessive braking of the image carrier and deficient tension of the spring member 108 can be adjusted by loosening the bolts 119 and shifting the control cam plate and the rises 120 thereon with respect to the driving disk 98. In this manner the image carrier is efficiently and accurately indexed with a minimum of wear on the parts and noise in operation.

As a safeguard against backward movement of the image carrier and to prevent any rebound or vibration of the disk 92 upon engagement with the escapement arm 94, a one-way clutch is provided in the supporting block 76 for engaging the shaft 89. Such a one-way clutch may be of standard construction and comprises a series of tapered recesses 122 in the block 76, a roller 123 in each recess and a spring 124 behind the roller 123.

*Optical compensator*

In spite of the effectiveness and efficiency of the indexing means just described, it is not possible to index the large and heavy image carrier with sufficient accuracy so that each image element occupies precisely the same position previously occupied by the preceding image element. Also the indexing time often available is so short that the image carrier must be stopped so abruptly that it may be caused to vibrate. Under either or both of these circumstances, there will be lack of registry or unsteadiness of the image on the screen. Conceivably, good vertical registration of the images could be obtained by purely mechanical means such as a mechanical dowel pin inserted into an accurately located hole on the carrier but such a mechanism would be extremely noisy and there would be terrific wear upon the dowel pins and other parts of the machine.

According to the present invention an "optical-doweling" of the image elements on the carrier is obtained by means of an optical compensator which is operatively connected to the image holders on the carrier and arranged so that any displacement or movement of the image in the gate is corrected for projection onto the screen. Such an optical compensator may comprise a plane-parallel transparent plate mounted for rotation in alignment with the gate station and located between the image element and the projection lens.

Specifically, a plane-parallel glass plate 125 is mounted at one end in a socket 126 on the end of a hollow shaft 127 which is rotatably mounted within an eccentrically located bore provided in the sleeve 60. One end of said shaft 127 is reduced in diameter and supported by a ball-bearing ring 128 and the other end of shaft 127 carries a pinion gear 129. Shaft 127 is intermediately provided with a pair of opposed openings 130 and has a transverse pin 131. A sleeve 132 is rotatably mounted upon said shaft 127 and is provided externally with gear teeth 133 equal in number to the teeth of pinion gear 129 and has a transverse pin 134 extending through the openings 130 of hollow shaft 127. A torsion spring wire 135 has one end fastened around the transverse pin 131 and its other end fastened around the transverse pin 134. The torsion spring wire 135 tends to rotate the sleeve 132 and gear teeth 133 thereon to engage the opposite side of the teeth being engaged by the pinion gear 129. As a result, there can be no back-lash or lost motion between movement of the toothed sectors 50 with which the teeth 129 and 133 are in mesh and this positive relationship between the movement of a toothed sector 50 and rotation of the transparent glass plate 125 is of great importance in optical compensation. Otherwise, the back-lash or lost motion would not occur in the same amount for each tooth contact and the optical compensator would not always accurately correct for any displacement or movement of the image element at the gate station.

In order to eliminate any errors of optical compensation due to any inaccuracies in the glass plate 125 or the mounting thereof, said glass plate 125 is turned one complete revolution for each indexing movement so that the image beam from an image element always passes through glass plate 125 in the same direction. Consequently, any errors in the optical compensator do not vary for successive images such as might be the case if the glass plate was only rotated 180° for each indexing of an image element.

This complete revolution of the optical compensator is attained by providing the same number of teeth on the pinion gear 129 and in gear 133 on sleeve 132 as occur on the toothed sector 50 of the holder 48. Hence, the angular position of the glass plate 125 during projection through an image element is determined by the center tooth 50' on the holder 48 and the indexing movement of the image carrier by the indexing means need only be of sufficient accuracy to bring the center tooth 50' of the succeeding holder 48 into engagement with the pinion gear 129 and gear teeth 133 whereupon said center tooth 50' again determines the angular position of the glass plate 125. Since the photographic transparency 55 is mounted with extreme accuracy on the holder 48 with respect to the tooth 50' it will be evident that any displacement of the image element with respect to the gate station or optical system will be compensated by the glass plate 125 to bring the image on the screen into precisely the same position as that occupied by the previous image. Also, if the image carrier should be vibrating as a result of the indexing movement, such vibrations will be transmitted through the torsion spring split pinion and the glass plate 125 will have a movement corresponding to such vibrations and in spite of such motion of the image carrier the image on the screen will remain stationary by reason of the function of the optical compensator.

The optical compensator is so mounted that it may be adjusted for the best gear contact between the teeth 133 and of pinion gear 129 with the toothed sector 50. As previously explained, a large portion of the weight of the image carrier rests against a radial supporting member of the mounting means or in other words the annular shoulder 45 of ring carrier 44 is in rolling contact with the periphery of ball-bearing roller 57. The eccentric location of the hollow shaft 127 within the sleeve 60 provides a means of adjusting the gear contact for the optical compensator by loosening the set screw 61 and turning the hexagonal collar 62 by means of a wrench until the teeth 133 on sleeve 132 and the teeth of pinion 129 mesh properly with the toothed sectors 50 of the holders 48.

Shutter system

Although it shall be understood that various types of shutter mechanisms may be used with the projector previously described without departing from the scope of the invention, the shutter system disclosed herein and shown in Figs. 1 to 4, inclusive, is particularly suited for use with the projectors shown because it has a minimum mass and can be easily moved and controlled.

A shutter frame is mounted on the front of the projector and comprises side uprights 136 connected by a base bar 137 which is attached to the front spacer bar 19 by bolts 138 and spacer sleeves 139. The upper ends of side uprights 136 are bolted between the lens support bars 35, one of said bars 35 supporting at one end a pulley housing 140 and at the other end a pulley housing 141. Each of the pulley housings, see Fig. 4, rotatably supports four pairs of pulleys and the pulley assemblies 142 and 143 are mounted on the front of the base bar 137, each pulley assembly having four single pulleys in alignment with the pairs of pulleys in the housings 140 and 141.

Shutter blades 144, 145, 146 and 147 are mounted for movement to open and close the respective illuminating and optical systems of each projector phase. Each shutter blade is supported by a system of cables extending around the various pulley housings and assemblies and is operated by a corresponding cam and follower arm to move said shutter blades in any desired sequence according to the design of the operating cams.

The cable system for shutter blade 144 includes a cable 148 extending around the pulley 149 on shaft 150 of pulley housing 140 and also around the pulley 151 on the shaft 152 of the pulley housing 141. A lower cable 153 encircles the pulley 154 journaled on shaft 155 of pulley housing 140 and also encircles the pulley 156 on the shaft 157 of pulley housing 141. Said cables 148 and 153 are joined to a cable 159 by a splice 158, the other end of cable 159 being attached to the connector 160. At the other end, the cables 148 and 153 are also joined by a splice 161 to a cable 162 which encircles respective pulleys in the pulley assemblies 142 and 143 and which is attached to the connector 160. In order to maintain the proper tension on cables 148 and 153, coil springs 163 and 164 may be inserted thereinto. The shutter blade 144 has its upper end attached in any suitable manner to the cable 148 and its lower end attached to the cable 153. Thus it will be seen that movement of the connector 160 will move the blade 144 with respect to the objective assembly of the left-hand phase of the projector as viewed from Fig. 3.

In a similar manner the shutter blade 145 is supported and moved by a system of flexible strands or cables including the upper cable 165 passing over a pulley 166 of the pulley housing 140 and also over the pulley 167 of the pulley housing 141. The lower cable 168 passes over the pulley 169 of pulley housing 140 and over the pulley 170 of the pulley housing 141. As before, the ends of cables 165 and 168 are connected by a splice 171 to a cable 172 attached to a connector not shown but similar to the connector 160.

The other ends of cables 165 and 168 are also joined by a splice 173 to a cable 174 which extends through the pulley assemblies 142 and 143 up to a connector similar to 160. Cables 165 and 168 may also include coil springs 175 and 176 to maintain the proper tension in the respective cables. The top of shutter blade 145 is attached to cable 165 and the bottom of shutter blade 145 is attached to cable 168 in any suitable manner such as by clamps or crimping the blade onto the cables. In a similar manner shutter blade 146 is mounted on a cable 177, see Fig. 4, which extends through the pulley housings 140 and 141 and the pulley assemblies 142 and 143 to a connector. Also shutter blade 147 is mounted on a cable 178 extending through the pulley housings and pulley assemblies to a connector 179.

The operating mechanism for such shutter assembly comprises a shaft 180 rotatably supported in the frame member and geared to the opposite end of output shaft 105 of reduction gear assembly 104. Said shaft 180 carries cams 181, 182, 183 and 184. Roller followers 185, 186, 187 and 188 are respectively associated with said cams 181 to 184 and are each mounted on the ends of lever arms 189, 190, 191 and 192 which are intermediately pivoted on a shaft 193 extending from one of said side uprights 136. A plurality of coil springs 194 are connected between the side upright 136 and each of the lever arms 189 to 192 so that the respective roller followers 185 to 188 are held against the periphery of the cams 181 to 184. Said cams 181 to 184 may be designed and timed to give various shutter operations and projection effects. Preferably, said cams 181 to 184 are designed to cross-dissolve from one projector phase to the other and so that the sequence of projection progresses successively across the machine. For instance, as shown in Fig. 3, the shutter blade 147 is in open position, while all of the other shutter blades 144, 145 and 146 are in closed position. A dwell in the cam 184, similar to that illustrated in cam 181, permits said shutter blade 147 to be opened by the action of the spring 194 and arm 192 upon the cable 172. As the cam shaft 180 revolves the dwell in cam 184 leaves the roller follower 188 and brings the lever arm 192 back into the position of the other lever arms 189 to 191 and the connector 179 is moved to move the cable 178 over its supporting pulleys and to move the shutter blade 147 into closed or covering position with respect to the optical system of the right-hand phase of the projector as viewed from Fig. 3. The dwell in cam 181 then comes opposite the roller follower 185 so that the arm 189 is raised by a spring 194 and connector 160 is raised to move the cable 162 and cables 148 and 153 so that the shutter blade 144 uncovers the optical system for the left-hand phase of the machine as viewed from Fig. 3. In a similar manner the dwells in the successive cams open and close the shutter blades 145 and 146.

Those skilled in the art will recognize that said shutter cams may be designed so that one shutter blade is being closed, while the other is being opened to give a cross-dissolve effect from one phase of the projector to another phase thereof or the opening and closing cycle of a shutter blade may be fully completed before another blade is opened and closed. In any event, the formation of cams 181 and 184 and their relative location with respect to each other on the shaft 180 determines the sequence and character of operation of the shutters 144 to 147.

It is pointed out that the gear driving connection between the drive for the indexing means and the cam shaft controlling the operation of the shutter blades may be such that the projector can be operated as a motion picture machine. As soon as the cam, such as cam 184 is operated to return 192 and the shutter blade 147 to closed position, the indexing assembly for that phase of the projector should have its rise 120 of the control cam plate 117 come into engagement with the roller 116 to raise the control arm 115 and escapement arm 94 to release the tension of the spring 108 for indexing of the image carrier for that phase as explained in connection with the indexing means. It should also be understood that the shutter means and indexing means for the projector according to our invention may be separately and automatically controlled in the manner more fully disclosed in the copending application of Fuller and Tuttle, Serial No. 350,006, filed August 2, 1940, for Automatic control system for photographic projectors whereby cross-dissolves of different speeds and "machine gun" effects can be produced. It must be understood that the mounting means for the image carrier and the indexing means and optical compensators are essential whatever the type or manner of projector operation. Consequently, the method of control is not more fully developed herein because this invention contemplates the mechanical features and combinations thereof defined in the claims which follow.

Having now particularly described our invention what we desire to secure by Letters Patent of the United States and what we claim is:

1. In a multiple phase projection apparatus having a gate station for each phase, the combination with an illuminating and optical system in alignment with the gate stations of at least two phases and for projecting respective images onto the same area, carrier means carrying a plurality of image elements and for supporting the image elements of each phase in the respective gate stations, and an indexing means connected to said carrier means and for intermittently moving the same and the image elements thereon with respect to said gate stations, of a shutter means movable into the illuminating and optical system of each phase and for alternately interrupting the image beam of one phase and unblocking the image beam of the other phase, and an optical compensator at the gate stations of at least two phases, operatively connected to said carrier means and correcting for any movement and/or displacement of an image element with respect to said illuminating and optical system.

2. In a projection apparatus having a gate station, the combination with a frame member, an illuminating and optical system in alignment with said gate station, a carrier member carrying a plurality of image elements and having a plurality of mechanical elements each accurately located with respect to a respective image element, and a mounting means on said frame member and for supporting said carrier member for movement of each of said image elements into said gate station, of an indexing means operatively connected to said carrier member for intermittently moving the same to bring said image elements into said gate station, and an optical compensator at said gate station, operatively connected to said carrier member through the mechanical elements corresponding to the image elements in the gate station, and correcting for any movement and/or displacement of said image elements with respect to said illuminating and optical system.

3. In a projection apparatus having at least two phases and a gate station for each phase, a pair of carrier members each including a plurality of mechanical elements and a plurality of separate individual image elements each mounted on the respective carrier members in precise relation to a predetermined one of said mechanical elements and for supporting the image elements of each phase in the respective gate station, and a pair of indexing means respectively connected to each carrier member and for intermittently moving the same and the image elements thereon with respect to said gate station, of an optical compensator at the gate station of each phase, operatively connected to the respective carrier member through said mechanical elements, and accurately positioned by the predetermined mechanical element corresponding to the image element in the gate station, and a pair of shutter members each associated with a phase and gate station and alternatively operated in timed relation to said indexing means to interrupt the image beam of one phase and permit projection of the image beam of the other phase onto the same area only when the optical compensator for said other phase is controlled by said predetermined mechanical element corresponding to the image element in the gate station of said other phase.

4. In a projection apparatus having a gate station, the combination with a frame member, an illuminating and optical system in alignment with said gate station, an image carrier having a plurality of mechanical elements and a plurality of image elements each accurately located with respect to one of said mechanical elements, and an indexing means operatively connected to said image carrier for intermittently moving and then stopping the same with an image element in said gate station, of an optical compensator in alignment with said gate station, operatively connected to said image carrier through the mechanical element corresponding to the image element in the gate station, a shutter means movable to closed and opened positions respectively to cover and uncover the image beam, and a driving means connected to said indexing means and said shutter means to operate them in timed relation and for moving said shutter means to open position only when said indexing means has stopped an image element in said gate station.

5. In a projection apparatus having a gate station, the combination with an image carrier having a peripheral rim, a plurality of mechanical elements thereon, and individual image elements each mounted on said rim in precise predetermined relation to one of said mechanical elements, and an indexing means operatively connected to said carrier and for moving each of said image elements into said gate station, of an optical compensator in alignment with said gate station, operatively connected to said image carrier through the mechanical element corresponding to the image element at said gate station, and correcting for any movement and/or displacement of said image element with respect to said gate station.

6. In a projection apparatus having a gate station, the combination with a carrier carrying a plurality of separate individual image elements and for supporting an image element in said gate station, and an indexing means operatively connected to said carrier for intermittently moving said carrier and for stopping the same with an image element in said gate station, of an optical compensator at said gate station, operatively connected to said carrier and correcting for any movement and/or displacement of said image element with respect to said gate station.

7. In a projection apparatus having a gate station, the combination with an image carrier including a plurality of mechanical elements and a plurality of separate image elements each mounted on said carrier in corresponding relation to a group of said mechanical elements and in precise relation to a predetermined one of said group of mechanical elements, and an indexing means operatively connected to said carrier, intermittently imparting an indexing movement to said carrier, and for moving into said gate station for projection an image element and the group of mechanical elements corresponding thereto including the predetermined one with respect to which that image element is precisely located, of an optical compensating means including a transparent block rotatably mounted in alignment with said gate station and including a driven member operatively engaging said mechanical element and adapted and arranged upon an indexing movement of said carrier to rotate said transparent block so that the same face thereof is adjacent the image element in said gate station during projection.

8. In a projection apparatus having a gate station, the combination with an image carrier including a peripheral rim, a plurality of teeth thereon, and a plurality of separate image elements each mounted on said rim in corresponding relation to a group of teeth and in precise relation to a predetermined tooth of said group, and an indexing means operatively connected to said carrier and for moving into said gate station an image element and the group of teeth corresponding thereto, of an optical compensating means including a transparent block rotatably mounted in alignment with said gate station and including a pinion having teeth equal in number to the number of teeth in said group and in mesh with said teeth on the image carrier.

9. In a projection apparatus having a gate station, the combination with an image carrier including a peripheral rim, a plurality of teeth thereon, and a plurality of separate image elements each mounted on said rim in corresponding relation to a group of teeth and in precise relation to a predetermined tooth of said group which is in the same position in each group, and an indexing means operatively connected to said carrier, intermittently imparting an indexing movement to said carrier, and for moving into said gate station an image element and the group of teeth corresponding thereto, of an optical compensating means including a transparent block rotatably mounted in alignment with said gate station and including a pinion having teeth equal in number to the number of teeth in said group and meshing with said teeth on the image carrier, one of said pinion teeth engaging said predetermined tooth of the group when the corresponding image element is in said gate station.

10. In a projection apparatus having a gate station, the combination with an image carrier including a plurality of mechanical elements and separate individual image elements each mounted on said carrier in a precise predetermined relation to one of said mechanical elements, of an optical compensator at the gate station, operatively connected to said image carrier through the mechanical element corresponding to the image element at the gate station, and automatically correcting for any movement and/or displacement of said image element with respect to said gate station.

11. In a projection apparatus having a gate station, the combination with a frame member, and an image carrier movable thereon and including a plurality of gear teeth and separate image elements each mounted on said carrier in corresponding relation with respect to a group of said gear teeth and in precise relation to a predetermined one of said teeth, of an optical compensating means comprising a support rotatably mounted on said frame member, a plain parallel transparent plate on said support and in alignment with said gate station, and a pinion gear on said support, having a plurality of teeth equal in number to the teeth of a group on said image carrier, and meshing with said gear teeth on the image carrier.

12. In a projection apparatus having a gate station, the combination with a frame member, and an image carrier movable thereon and including a mechanical element and an image element mounted on said carrier in precise relation to said mechanical element, of an optical compensator means comprising a plain parallel transparent plate mounted for rotation on said frame member and in alignment with said gate station, a pair of relatively movable mechanical elements, one of which is fixed with respect to said transparent plate and both for engaging the mechanical element on said image carrier, and a resilient means between said relatively movable mechanical element and urging them toward each other and against the opposite side of said mechanical element on the image carrier.

13. In a projection apparatus having a gate station, the combination with a frame member, and an image carrier movable thereon and including a mechanical element and an image element mounted on said carrier in precise relation to said mechanical element, of an optical compensator means comprising a shaft rotatably mounted in said frame member, a plain parallel transparent plate attached to said shaft and in alignment with said gate station, a plurality of teeth on said shaft at least one of which engages one side of said mechanical element on said image carrier, a ring of teeth rotatably mounted on said shaft, and a spring means, connected between said ring of teeth and said shaft and for urging at least one tooth of said ring against the other side of the mechanical element on said image carrier.

14. In a projection apparatus having a gate station, the combination with a frame, and an image carrier movable thereon and including a plurality of gear teeth and separate image elements each mounted on said carrier in corresponding relation with respect to a group of said gear teeth and in precise relation to a predetermined one of said teeth, of an optical compensator comprising a hollow shaft journaled in said frame member, a plain-parallel transparent plate mounted on said shaft and in alignment with said gate station, a split pinion having a toothed portion on said shaft and a toothed portion rotatable thereon, and a spring member within said hollow shaft and connected between the shaft and said rotatable toothed portion of said split pinion and for resiliently urging at least one tooth on each of said toothed portions against the opposite side of said predetermined tooth on said image carrier.

15. In a projection apparatus having a gate station, the combination with a frame member, and an image carrier movable thereon and including a plurality of mechanical elements and separate image elements each mounted on said carrier in precise predetermined relation to one of said mechanical elements, of an optical compensator means comprising a shaft rotatably mounted in said frame member, a plain-parallel transparent plate attached to said shaft, a pair of relatively movable mechanical elements on said shaft, and a torsion spring attached at one end to said shaft and at the other end to one of said relatively movable mechanical elements on said shaft and for urging said mechanical elements against the opposite sides of each of the mechanical elements on said image carrier.

16. In a projection apparatus having a gate station, the combination with a frame member, and an image carrier movable thereon and including a plurality of mechanical elements and separate image elements each mounted on said carrier in a precise predetermined relation to one of said mechanical elements, of an optical compensator means comprising a hollow shaft rotatably mounted in said frame member and provided with a pair of slots, a plain-parallel transparent plate attached to said shaft and in alignment with said gate station, a mechanical element fixed to said shaft, a sleeve rotatably mounted on said shaft and carrying a mechanical element, a transverse pin on said ring and extending through said slots of the hollow shaft, and a torsion spring wire within said shaft having one end attached to said shaft and the other end attached to said pin.

17. In a projection apparatus having a gate station, the combination with an image carrier including a plurality of image elements which are each movable into registry with said gate station, of an indexing means periodically operative to perform a cycle and move said image carrier to bring another image element into said gate station, and including a driving member, a driven member operatively connected to said image carrier, and a tensioned spring member connected between said driving and driven members and having such a period as to impart its energy to said carrier to move the same and then within the same cycle to receive energy by opposing movement of said carrier.

18. In a projection apparatus having a gate station, the combination with an image carrier including a plurality of image elements which are each movable into registry with said gate station, of an indexing means periodically operative to move said image carrier and bring another image element into said gate station, and including a driving member, a driven member operatively connected to said image carrier, and a tension spring member connected between said driving and driven members and having such a period as to oppose movement of the image carrier and to bring said image carrier to rest as an image element moves into registry with said gate station.

19. In a projection apparatus having a gate station, the combination with an image carrier including a plurality of image elements which are each movable into registry with said gate station, of an indexing means periodically operative to move said image carrier and bring another image element into said gate station, and including a driving member, a driven member operatively connected to said image carrier and a tensioned spring member connected between said driving and driven members, for imparting energy to said carrier to move the same and then receiving energy by opposing movement of said image carrier and having a period such that said image carrier is brought to rest just as another image element moves into registry with said gate station.

20. In a projection apparatus having a gate station, the combination with an image carrier including a plurality of image elements which are each movable into registry with said gate station, of an indexing means including a driven member operatively connected to said image carrier, an escapement engaging and holding said driven member, a driving member, a control member movable with said driving member, and a spring member between said driving and driven members, and a motor means connected to said driving member, for tensioning said spring member, and moving said control member to release said escapement so that the energy in said spring member accelerates the image carrier, the period of said spring member being such with respect to the masses of the image carrier and indexing means that said spring member then retards said image carrier to bring it to rest just as another image element moves into registry with said gate station.

21. In a projection apparatus having a gate station, the combination with an image carrier including a plurality of image elements which are each movable into registry with said gate station, of an indexing means comprising a driven member operatively connected to said image carrier, a driving member, a spring member connected between said driving and driven members, and an escapement holding said driven member against movement while said spring member is being tensioned by movement of said driving member and periodically operated by said driving member to disengage said driven member, said spring member being adapted and arranged to impart its energy to said carrier to move the same and then to receive a substantially equal amount of energy by opposing movement of said carrier to bring it to rest.

22. In a projection apparatus having a gate station, the combination with a frame member, and an image carrier movable thereon and including a plurality of image elements movable into said gate station, of a driven member operatively connected to said image carrier, a driving member, a spring member between said driving and driven members, an escapement holding said driven member against movement while said spring member is tensioned by movement of said driving member and intermittently actuated by said driving member to disengage said driven member, said spring member first imparting its energy to said carrier to move the same and then receiving energy from said carrier by opposing movement thereof, and an overrunning clutch means on said frame member, associated with said driven member and for preventing any reverse movement thereof after transfer of the energy from said image carrier to said spring member.

23. In a projection apparatus having a gate station, the combination with an image carrier including a plurality of image elements which are each movable into registry with said gate station, of an indexing means comprising a driven member operatively connected to said image carrier, a driving member, a power source connected to said driving member and for imparting a predetermined movement thereto, an escapement mechanism engaging and holding said driven member with said image element on said carrier in registry with said gate station, a control member movable with said driving member and for moving said escapement mechanism to release said driven member, and a spring member connected between said driving and driven members, tensioned by movement of said driving member while said escapement mechanism holds said driven member stationary and having a period such that, upon release of said escapement mechanism by said control member, the energy stored in said spring member first accelerates the image carrier and then said spring member retards said image carrier to bring it to rest just as another image element comes into registry with said gate station and just as said escapement mechanism reengages said driven member.

24. In a projection apparatus having a gate station, the combination with a rotatable image carrier including a plurality of image elements which are movable into registry with said gate station, of an indexing means cyclically operative to move said image carrier and comprising a rotatable driven member operatively connected to said image carrier, a rotating driving member, an escapement engaging and holding said driven member with an image element in registry with said gate station, a control member rotatable with said driving member and having a portion for moving said escapement to disengage said driven member, and a spring member connected between said driving and driven members and adapted and arranged during a cycle to be tensioned by said driving member while said driven member is engaged by said escapement, adapted upon disengagement of said escapement first to impart its energy to said driven member and said image carrier and later to receive energy from said image carrier by opposing its movement, and finally giving up its energy to the driving member and then being tensioned thereby for a repetition of the cycle.

25. In a projection apparatus having a gate station, the combination with an image carrier including a plurality of image elements movable into said gate station, of a driven member operatively connected to said image carrier, an abutment on said driven member, an escapement mechanism engaging said abutment to stop said image carrier with an image element in said gate station, a driving member, a spring member connected between said driving and driven members and placed under tension by movement of said driving member while said escapement mechanism engages said driven member, and a control member movable with said driving member and having a portion for releasing said escapement mechanism and permitting movement of said image carrier by the tension in said spring member which is then tensioned by the continued movement of said image carrier to bring another image element into said gate station, the period of said spring member and timing of said control member being such that the image carrier comes to rest with said other image elements in said gate station as said escapement reengages said abutment.

26. In a projection apparatus having a gate station, the combination with an image carrier including a plurality of image elements movable into said gate station, of a driven member operatively connected to said image carrier, an abutment on said driven member, an escapement mechanism engaging said abutment to stop said image carrier with an image element in said gate station, a driving member, a spring member connected between said driving and driven members and placed under tension by movement of said driving member while said escapement mechanism engages said driven member, a control member movable with said driving member and having a portion for releasing said escapement mechanism, and an adjustable connection between said control member and said driving member for varying the timed relation between the tensioning of said spring member and the release of said escapement mechanism.

27. In a projection apparatus having a gate station, the combination with an image carrier including a plurality of image elements which are each movable into registry with said gate station, of an indexing means comprising a closed housing adapted to contain a fluid, a driving member operatively connected to said image carrier and having a plurality of abutments within said housing, an escapement mechanism within said housing and having a portion for engaging the abutment on said driving member, and a hood member on said portion of the escapement mechanism, forming a dampening chamber between said portion of the escapement mechanism and an abutment of said driving member, and for temporarily entrapping some of said fluid to cushion the engagement of said escapement mechanism with the abutment of said driving member.

28. In a projection apparatus having a gate station, the combination with a frame member, a circular carrier member comprising a peripheral rim, a plurality of peripheral mechanical elements around said rim, and a plurality of individual image elements mounted on said rim in precise relation to predetermined ones of said mechanical elements, of mounting means on said frame member for supporting said carrier with an image element in said gate station and comprising a plurality of radial supporting members engaging the periphery of said rim and including a radial support member adjacent said gate station for accurately locating radially only that portion of said rim which is at the gate station, an optical compensator including a transparent block in alignment with said gate station, a shaft attached to said block, and a pinion on said shaft, and a bearing member on said frame internally supporting the shaft of said optical compensator with said pinion in engagement with at least one of said peripheral mechanical elements, and externally supporting the radial support member adjacent said gate station.

29. In a projection apparatus having a gate station, the combination with a frame member, an image carrier carrying a plurality of image elements, having a peripheral rim and a plurality of teeth thereon, of mounting means on said frame member for supporting said carrier with an image element in said gate station and comprising a plurality of radial supporting members engaging the periphery of said rim, an optical compensator including a shaft and a pinion thereon, a supporting block on said frame member, a bearing sleeve in said block and provided with a bore in which the shaft of said optical compensator is journaled to support said compensator in alignment with said gate station and with said pinion in engagement with the teeth on said peripheral rim, and a roller rotatable on said bearing sleeve to engage the periphery of said rim and form one of the radial supporting members of said mounting means.

30. In a projection apparatus having a gate station, the combination with a frame member, an image carrier carrying a plurality of image elements, having a peripheral rim and a plurality of teeth thereon, of mounting means on said frame member for supporting said carrier with an image element in said gate station and comprising a plurality of radial supporting members engaging the periphery of said rim, an optical compensator including a shaft and a pinion thereon, a supporting block on said frame member, a bearing sleeve mounted in said block for rotational adjustment about an axis and provided with a bore which is eccentric to said axis and in which the shaft of said optical compensator is journaled to support said compensator in alignment with said gate station and with said pinion in engagement with the teeth on said peripheral rim, and a roller rotatably mounted on said sleeve for engagement with the periphery of said rim and constituting one of said radial supporting members of said mounting means.

31. In a projection apparatus having a gate station, the combination with a frame member, a projection lens mounted on said frame member and having a focal plane in said gate station, a circular carrier member carrying a plurality of image elements arranged around the periphery thereof, and a driving means operatively connected to said carrier member for rotating the same to move said image elements into said gate station, of a mounting means on said frame member for supporting said carrier in a vertical position and including at least two supporting members for peripherally engaging and supporting said carrier member, one of said supporting members being located adjacent said elements at the gate station in the focal plane of said projection lens, and the other of said supporting members being located on the opposite side of the center of gravity of said carrier and supporting said carrier so that the weight thereof holds it against the first-mentioned supporting member.

32. In a projection apparatus having a gate station, the combination with a frame member, an image carrier carrying a plurality of image elements, having a peripheral rim, and having a plurality of teeth thereon, of mounting means on said frame member for supporting said carrier with an image element in said gate station and comprising a plurality of radial supporting members engaging the periphery of said rim, an optical compensator in alignment with said gate station and mounted upon a shaft carrying a pinion, and a support on said frame member adjacent said gate station, rotatably supporting the shaft on said optical compensator with the pinion thereon in mesh with the teeth on said carrier, and rotatably supporting a roller in contact with the periphery of said rim to form one of said radial supporting members.

33. In a projection apparatus having a gate station, the combination with a frame member, an image carrier carrying a plurality of image elements, having a peripheral rim, and a plurality of teeth thereon, of mounting means on said frame member for supporting said carrier with an image element in said gate station and comprising a plurality of lateral guide members engaging the sides of said rim, and indexing means on said frame member and including a bearing, a shaft rotating therein, and a pinion engaging the teeth on said carrier, and a roller rotatably mounted externally on said bearing and engaging a side of said carrier to form one of said lateral guide members.

FORDYCE TUTTLE.
ALBERT B. FULLER.

CERTIFICATE OF CORRECTION.

Patent No. 2,289,811.　　　　　　　　　　　　　　　　　　July 14, 1942.

FORDYCE TUTTLE, ET AL.

It is hereby certified that error appears in the printed specification of the above numbered patent requiring correction as follows: Page 11, second column, line 7, claim 31, before "elements" insert --gate station and peripherally engaging a portion of the carrier accurately to locate the image--; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.